March 19, 1963     J. L. GRATZMULLER     3,082,358

ELECTRO-MAGNETIC CONTROL DEVICE

Filed Aug. 24, 1959     3 Sheets-Sheet 1

Inventor
J. L. Gratzmuller

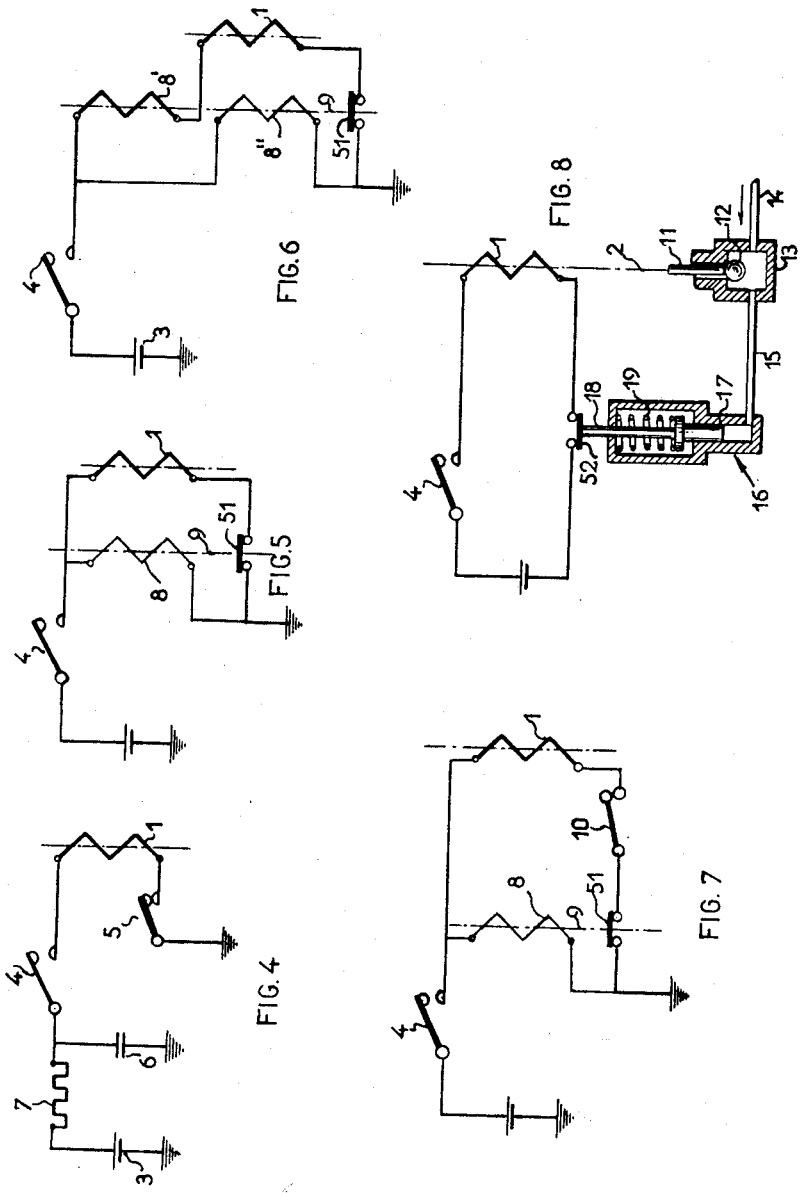

United States Patent Office 3,082,358
Patented Mar. 19, 1963

3,082,358
ELECTRO-MAGNETIC CONTROL DEVICE
Jean Louis Gratzmuller, 66 Boulevard Maurice Barres,
Neuilly-sur-Seine, France
Filed Aug. 24, 1959, Ser. No. 835,603
Claims priority, application France Aug. 30, 1958
13 Claims. (Cl. 317—157)

This invention relates to electro-magnetic control devices and, more particularly, to those which are intended to ensure a mechanical action within a very short time in response to a relative displacement between the core of an electro-magnet and its armature.

Heretofore, it has been generally admitted that the only possibility of practically designing devices of this type was to resort to alternating current, since direct current was considered as being inadequate owing to the impossibility of obtaining within a very short time the conditions required for starting the operation without excessive heating. This time will be called hereunder the "triggering time."

However, with an industrial alternating current having, for example, a frequency of 50 c.p.s. only triggering time as long as about $\frac{1}{100}$ of a second (one half-cycle) can be contemplated since, for shorter times, one would risk to dispose of no current at all at the very moment when the mechanical action is to be triggered (this results directly from the fact that the sinusoidal curve of the voltage passes through zero value twice during each cycle).

An object of the invention is to provide an electro-magnetic control device capable of triggering a mechanical action within a time materially shorter than $\frac{1}{100}$ of a second. As a matter of fact, it is even possible, as shown by experiments, to obtain, with an electro-magnetic control device according to the invention, triggering times shorter than $\frac{1}{1000}$ of a second, as well as an overall operation time (i.e. the time required for completely carrying out a given control operation in respect to a given order at least ten times shorter than with alternating current.

The device according to the invention is essentially based on the following idea: There is established a circuit comprising a direct current source, a control electro-magnet and circuit-making and breaking switching means and the said circuit is so designed that the electro-magnet be capable of effecting the desired control action within an extremely short time and that the current energizing the said electro-magnet be cut off as soon as the said action is completed and far before the said current can reach its steady value.

For this purpose, it is an object of the invention to reduce the resistance of the circuit to as low a value as practically feasible and the said circuit is subjected to an energizing voltage capable of supplying the said circuit with a current which, if it could reach its steady value, would rapidly destroy the winding.

Another object of the invention is to use a winding having a low inductance with just that number of turns which is sufficient to obtain enough ampere-turns for ensuring the saturation of the magnetic circuit within a time shorter than the required triggering time.

It is still another object of the invention to incorporate in the circuit a rapid contact-breaker adapted to cut off the current as soon as the control action is completed, far before the steady current can build up to steady value and before the heat generated in the circuit in response to current flow can reach a dangerous value. It is to be noted that since the current subsists in the circuit only during a time of about 5 msec. it is possible to let the current strength build up to a value corresponding to a current density which is usually considered as quite inadmissible without $\int RI^2 dt$ becoming dangerous (R being the resistance, I the current strength and $t$ the time).

In the device according to the invention, working takes place entirely with transient and not steady current which constitutes a characteristic difference between this device and all existing electric apparatus and which permits effecting a mechanical control by means of a simple and not expensive electro-magnet within a time at least ten times shorter than with the best known electro-magnetic control devices operating with alternating current.

Another advantage of the electro-magnetic control device according to the invention is that the above mentioned surprising result is obtained not only by means of a non-expensive electro-magnet of simple construction, but also by means of a direct current source which is also very simple and non-expensive.

It is a more specific object of the invention to use a direct current source, a simple primary cell battery shunted by a condenser. Experiments have shown that with such an arrangement the amount of electricity consumed during one control operation was so small, due to the extremely short duration of this operation, that the source could be used for extremely long periods without undergoing any deterioration. It has been even observed that the load of the condenser was but very slightly reduced by one operation of the electro-magnet which is also a characteristic difference between the device according to the invention and those which use a whole condenser load to obtain a quick action of limited duration.

This property permits, in particular, easily obtaining with a simple and non-expensive equipment, a considerable number of successive operations.

It is yet a further object of the invention, in order to reduce still further the cost of the device, to use a set of condensers as currently sold on the market for radio-electric purposes, said condensers being mounted in parallel with each other.

It is a further object of the invention to use as a direct current source proper a primary cell of low capacity, the circuit being completed by a resistor interposed between the primary cell and the condenser, which reduces the instantaneous discharge of the primary cell and thus cooperates to give it a long life.

It is to be understood that the control of the contact-breaker for cutting off the current at the required instant may be designed in any desired manner within the scope of the invention.

There is described hereunder, a number of specific embodiments of the invention showing beyond any doubt how easy and simple it is to design a contact-breaker adapted to be used in the electro-magnetic control device according to the invention.

In one embodiment, the contact-breaker is controlled by means of a time-responsive device automatically triggering the operation of said contact-breaker, after a well-defined time following the instant at which the contact-making means are closed.

In another embodiment the contact-breaker is controlled as a function of the strength of the current flowing through the circuit.

In another embodiment, the contact-breaker is controlled by a mechanism automatically triggered in response to completion of the mechanical action controlled by the electro-magnet.

In a particular application, the said action is ensured by a hydraulic control. In this case, cut-off may be effected by means of a contact-making and contact-breaking switch of the type described in the French patent application No. 773,286, filed on August 27, 1958, by the applicant, for "Make and Break Switch."

It is to be understood moreover that the invention is intended to cover not only any electro-magnetic control device of the type defined above, whatever may be its applications, but also any apparatus whose operation requires very quick triggering and wherein such a device is incorporated. As a matter of fact, certain apparatus can be used in practice only if they can operate within an extremely short predetermined time. Such apparatus can be therefore used in practice only if they are provided with an electro-magnetic control device according to the invention.

It is therefore another object of the invention to provide, as a new industrial product, a quick-acting apparatus provided with an electro-magnetic control device according to the invention.

A more specific object of the invention is to provide an electric circuit-breaker, e.g. for high-voltage networks provided with a high-speed electro-magnetic control device according to the invention.

A still more specific object of the invention is to provide a hydraulically controlled electric circuit-breaker, wherein the hydraulic circuit is controlled by a movable member actuated by means of a high-speed electro-magnetic device according to the invention.

As a matter of fact, the hydraulic type circuit-breaker control seems to be heretofore the only one capable of ensuring very quick circuit-breaking. Some applications however have been made impossible up to now due to the comparatively slow operation of the electric parts. With an electro-magnetic control device according to the invention, this cause of delay can be eliminated.

An assembly constituted by a hydraulic control whose operation is triggered by means of an electro-magnetic device according to the invention, thus constitutes a new industrial product capable of ensuring the desired very quick operation of electric circuit-breakers.

Other objects and advantages of the invention will be hereinafter described with reference to the accompanying drawings, given merely by way of example.

Figure 3:
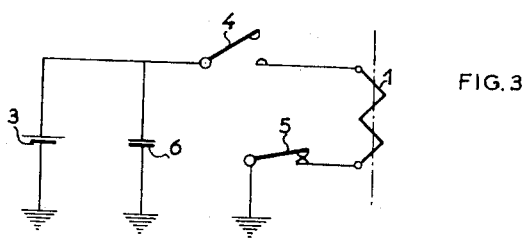

FIG. 3 diagrammatically shows a modification in which the current source is shunted by a condenser.

FIG. 4 is a diagrammatic view similar to FIG. 3, but wherein a resistor is interposed between the source and the condenser;

FIG. 5 diagrammatically shows an alternative embodiment wherein the automatic cut-off is ensured by a conventional electro-magnetic relay;

FIG. 6 is a diagrammatical view of another embodiment comprising a cut-off relay provided with two coils.

FIG. 7 shows another construction comprising both a mechanically controlled circuit-breaker and a cut-off relay.

Figure 9:
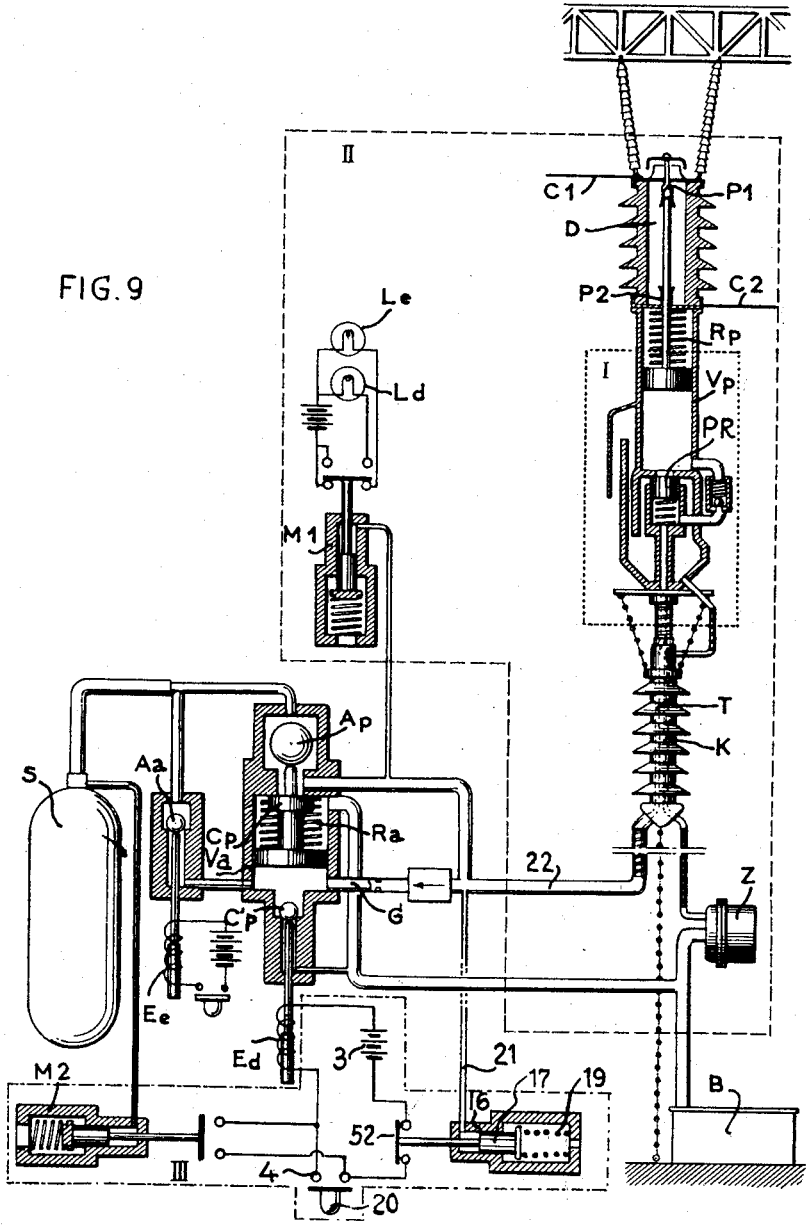

FIG. 8 diagrammatically shows the general layout of a hydraulically-controlled contact-breaking switch adapted to be used in the electro-magnetic control device according to the invention, and FIG. 9 is a general diagrammatic view of a high-voltage circuit-breaker in which an electro-magnetic control device according to the invention is incorporated.

In all figures, the corresponding parts have been designated by the same references.

Figure 1:
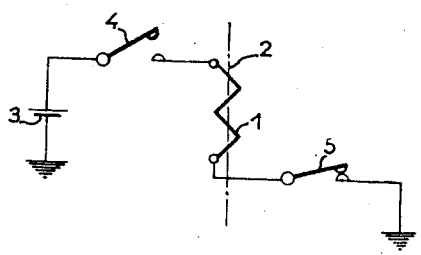
FIG. 1 is a general diagram of an electro-magnetic control device according to the invention.

As shown in the general diagram of FIG. 1, the electro-magnetic control device according to the invention is essentially constituted by an electro-magnet 1 acting through a suitable mechanical link 2 on the mechanism to be controlled. 3 is a direct current source adapted to be connected by means of a contact-making switch 4 to the winding of the electro-magnet 1 under the control of a contact-breaking switch 5.

It is to be noted that the expressions "contact-making switch" and "contact-breaking switch" are used in this specification, with a generic meaning to designate any apparatus or mechanism respectively controlling normally open or make contacts and normally closed or break contacts. In particular, the contact-making switch 4 could be constituted by an electro-magnetic relay provided with a make-contact and the contact-breaking switch 5 by an electro-magnetic relay provided with a break-contact.

Figure 2:
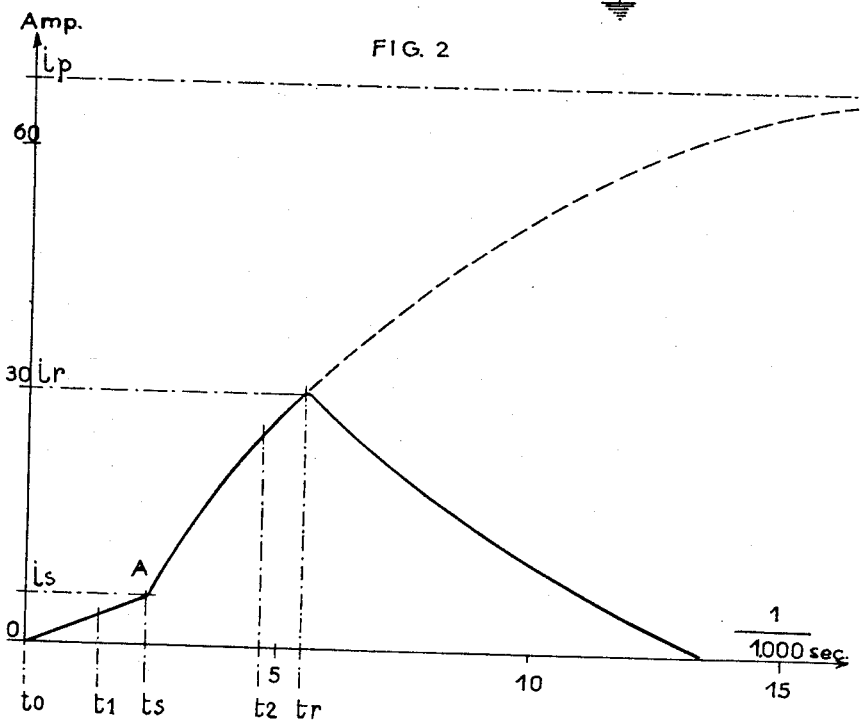
FIG. 2 is a curve of the current strength vs. time in the energizing circuit of the electro-magnet of the device.

The characteristic features of the electro-magnet 1 will be better understood with reference to FIG. 2 showing in the shape of a curve having a full-line portion and a dotted-line portion, the variations that the current flowing through the circuit would undergo as a function of time if the source 3 were permanently connected to the winding of the electro-magnet. On this curve, time is plotted in abscissae in msec. and the current is plotted in ordinates in amperes.

This curve is the reproduction of an oscillogram corresponding to the operation of an electro-magnetic control device according to the invention in a specific construction actually developed by the applicant and whose features are the following: Force to be generated: 32 kg.; Resistance of the circuit including the source: 1.8ω; Energizing voltage: 127 v.; Steady current:

$$\frac{127}{1.8} = 70 \text{ a.}$$

Number of turns: 370 (more than ten times less than in a conventional electro-magnet); Copper wire of $75/100$ mm. diameter. In these conditions, the saturation of the magnetic circuit is obtained with a current of about 5 a.

$i_p$ designates the asymptotic steady current value.

The device operates as follows: $t_0$ is the instant at which the contact-making switch 4 is closed. If the contact-breaking switch 5 were to remain closed, it may be seen on the curve that the electro-magnet would risk becoming deteriorated after a time of about 15 msec.

According to the invention, however, the contact breaking switch 5 is automatically actuated either as a function of time or by other means described hereunder, so that the circuit is interrupted at an instant such as $t_r$ but slightly ulterior to the instant $t_2$ at which the electro-magnet 1 has completed its control action began at $t_1$, and materially anterior to 15 msec. The value of the current at $t_r$ is designated by $i_r$. It may be seen that this value is materially lower than the steady value $i_p$. It may be seen also that the overall operating time $t_2-t_0$ is of about 4 msec. and the triggering time $t_1-t_0$ of about 1 msec. It may be seen finally that the inflection A is due to the saturation of the magnetic circuit of the electro-magnet, which takes place for a current $i_s$ and at time $t_s$.

In the embodiment shown in FIG. 3, a condenser 6 is mounted as a buffer means between the source 3 and the electro-magnet 1.

The condenser 6 acts as a power accumulator: it is loaded from the source 3 and can discharge the stored power extremely quick, at a rate considerably higher than that of the source.

As a matter of fact, the electro-magnet 1 operates so quickly that each operation but slightly reduces the load of the condenser. This arrangement permits using as a direct current source a simple primary cell which has an extremely long life and does not risk undergoing any kind of deterioration.

In the modification shown in FIG. 4, there is used a primary cell 3 of very low capacity and the circuit is completed by a resistor 7 mounted between the primary cell 3 and the condenser 6. The resistor 7 limits the discharge of the primary cell into the condenser thus cooperating to increase the life of the primary cell.

As mentioned above, the automatic actuation of the contact-breaking switch 5 may be ensured in various ways. In the embodiment shown in FIG. 5, the contact-breaking switch is constituted by a conventional relay having a triggering time of a few msec. and which, since it is parallel connected with the electro-magnet 1, is energized simultaneously therewith. This relay comprises a coil 8, a mechanical link 9 and a break-contact 51. The contact 51 opens a few msec. after closing of the contact-making switch 4, once the electro-magnet 1 has completed its mechanical action and far before the current can reach a dangerous value.

In the alternative embodiment shown in FIG. 6, the contact-breaking switch is constituted by a relay provided with two coils one of which, 8', mounted in series with the electro-magnet 1, causes opening of the break-contact 51 when the current flowing through the electro-magnet 1 reaches a predetermined value, while the shunt-coil 8' holds the said contact open.

In the modification shown in FIG. 7, the device comprises an end-of-stroke switch 10 which cuts off the circuit of the electro-magnet 1 as soon as the controlled mechanism reaches the end of its stroke. The device further comprises a relay provided with a break-contact 51 series-mounted with the switch 10 and cutting the said circuit off at a second point a few msec. after closing of the contact-making switch 4. With this arrangement, the circuit of the electro-magnet 1 remains interrupted in spite of the contact-making switch 4 being closed, even if the switch 10 happens to close again. On the other hand, the switch 10 permits interrupting the circuit as soon as the mechanical action is completed, without waiting for the operating time of the relay which, for the sake of safety is necessarily chosen longer than the duration of the said mechanical action.

In FIG. 8, there is shown, in an extremely simple shape, how the completion of a mechanical action may cause automatic actuation of a contact-breaking switch. In this embodiment, the automatic control of the contact-breaking switch and the mechanical action effected by the electro-magnet 1 are of hydraulic nature. The mechanical action ensured by the link 2 is symbolized by a thrust exerted on a rod 11 unseating a ball-valve 12 setting to exhaust through a duct 15 a hydraulic cylinder 16 which was otherwise held under pressure through the already cited duct 15 and another feed duct 14.

The piston 17 of the hydraulic cylinder 16 is rigid with a rod 18 carrying the movable contact 52 of the contact-breaking switch. The contact is normally held in closed state by the pressure acting in the cylinder 16 against a spring 19. As the valve 12 sets the cylinder to exhaust, the piston 17 is released and the spring 19 becomes capable of separating the switch contacts. It is to be understood that the characteristics of the hydraulic control system described above have to be so chosen that the operation of the contact-breaking switch be extremely rapid and shortly follow the completion of the mechanical operation ensured by the link 2. For this purpose, it is preferred to use the contact-making-and-breaking switch described in the above cited prior specification.

It is clear that the embodiment just described with reference to FIG. 8, is particularly suitable when the electro-magnetic control device according to the invention has to assume a hydraulic function.

As a specific example, there is described here under the application of an electro-magnetic control device according to the invention to the hydraulic control of a high voltage circuit-breaker by means of the hydraulic control system for circuit-breakers described in the U.S. Patent No. 2,900,960, filed by the applicant, on January 3, 1955.

FIG. 9 shows a circuit-breaker hydraulic control plant of this type comprising as previously, a contact-making switch 4 as described above, which, in this example, is actuated by a push-button 20. $E_d$ is the counter-part of the electro-magnet 1 of the device according to the invention; 3 designates a suitable source of direct current while 52 is, as previously, a break-contact which, in this example is controlled by a hydraulic cylinder 16 of the type shown in FIG. 8, as described hereunder. The cylinder 16 is connected through a pipe 21 to the main feed and exhaust duct 22 interconnecting the hydraulic control with the circuit-breaker.

The circuit-making signal is received by the circuit-making electro-magnet $E_e$. This electro-magnet unseats the admission valve $A_a$ of the auxiliary cylinder $V_a$; the latter, thus put under pressure, opens the main admission valve $A_p$ while closing the exhaust valve $C_p$ of the main cylinder $V_p$ against the action of the spring $R_a$. Thereupon, the pressure fluid source S sends pressure fluid into the main cylinder $V_p$ through the insulating pipe T and the circuit-making takes place against the action of the circuit-breaking spring $R_p$, as shown in FIG. 9. Thereupon, the hydraulic holding circuit G, which is supplied with fluid since the valve $A_p$ is open, keeps the auxiliary cylinder $V_a$ under pressure and hence the said valve $A_p$ in open position. In these conditions, the circuit-breaker D is held in circuit-making position by the cylinder $V_p$. This condition prevails as long as the cylinder $V_a$ is not exhausted.

At the same time, the pressure prevailing in the feed and exhaust duct 22 acts through the pipe 21 on the piston 17 of the cylinder 16 which compresses the contact-breaking spring 19 thus holding the break contact 52 in closed condition.

The exhaust of the cylinder $V_a$ is normally triggered as the circuit-breaking electro-magnet $E_d$ receives the circuit-breaking signal. This electro-magnet, whenever energized, unseats the exhaust valve $C'_p$ of the auxiliary cylinder $V_a$. The latter, under the action of its spring $R_a$, opens the exhaust valve $C_p$ of the main cylinder $V_p$ and recloses the admission valve $A_p$ of the same. The insulating pipe T is then exhausted which triggers operation of the quick exhausting device I. The circuit-breaker D then effects its circuit-breaking stroke under the action of the spring $R_p$, which is no more opposed by the fluid pressure.

Owing to the electro-magnetic control device according to the invention, as soon as exhaust of the main cylinder $V_p$ is completed, since no more pressure prevails in the ducts 22 and 21, the spring 19 is made free to open the contact 52, and the current previously flowing through the circuit of the electro-magnet $E_d$ is interrupted. This arrangement permits ensuring very quick circuit breaking owing to the use of an electro-magnetic control device according to the invention, such as described in the preamble, the energizing of which is interrupted within a very short delay upon completion of the circuit-breaking stroke of the circuit-breaker, in the previously described conditions.

While the invention has been described with particular reference to preferred embodiments, it is not intended to limit the scope of the invention to the embodiments illustrated, nor otherwise than the terms of the subjoined claims.

What I claim is:

1. An electro-magnetic device comprising, in combination, an electro-magnet having a core member and an armature member mounted for relative displacement and adapted to ensure a desired control action, by such displacement within a predetermined time which is a small fraction of a second, an energizing circuit including in series a winding mounted on one of said members, a direct current source and contact-making and breaking switch means to cause said relative displacement, said circuit having as low a resistance as practically possible, said direct current source being capable of supplying said circuit with a current which, if it were allowed to reach its steady value within a small fraction of a second which is greater than said predetermined time, would destroy said winding, the latter having a number of turns just sufficient to ensure saturation of said members in a time sufficiently short to cause triggering of said control action within a fraction of said predetermined time such as about 1/1000 of a second after closing of said contact-making means and said contact-breaking means being adapted to cut-off said circuit as soon as said control action is completed, far before the current can reach its steady value and before the heat developed in said circuit due to flow of said current has time to reach a dangerous value.

2. An electro-magnetic control device, as claimed in claim 1, wherein the said winding is constituted by a very small number of turns of thick wire so as to reduce both its resistance and inductance.

3. An electro-magnetic control device, as claimed in claim 1, wherein the direct current source is constituted by a primary cell shunted by a condenser.

4. An electro-magnetic control device, as claimed in claim 1, wherein the direct current source is constituted by a condenser fed from an energizing source of unidirectional current through a resistor limiting the power consumption of the said energizing source.

5. An electro-magnetic control device, as claimed in claim 1, wherein the contact-breaking switch means are actuated after a predetermined delay time following the operation of the contact-making means.

6. An electro-magnetic control device as claimed in claim 1, wherein the contact-breaking means are actuated as soon as the current flowing through the circuit reaches a predetermined value less than the steady state value.

7. An electro-magnetic control device, as claimed in claim 1 wherein the contact-breaking means are actuated as soon as the desired mechanical action is completed.

8. An electro-magnetic control device, according to claim 7, wherein said mechanical action is provided by a source of fluid pressure, a fluid pressure responsive member, spring means biasing the fluid pressure responsive member to actuate the contact-breaking means, said fluid pressure responsive means being responsive to a predetermined pressure of the fluid source for maintaining the contact-breaking means closed against the spring bias, and a control valve actuated by the electromagnet upon energization thereof for relieving the pressure on the fluid pressure responsive member to permit actuation of the contact-breaking means.

9. An electro-magnetic control device, as claimed in claim 5, wherein the contact-breaking means is constituted by a relay having a break contact and an energizing coil shunted across the winding mounted on one of the members of the electromagnet, fed from the contact-making means and shunting the circuit-breaking means, the predetermined delay being provided by the time constant of the said relay.

10. An electro-magnetic control device, as claimed in claim 6, wherein the contact-breaking means is constituted by a relay having a break contact and two coils, one of said coils being in series with the winding mounted on one of the members of the electro-magnetic, while the other is shunted across at least said winding and the contact-breaking means, the characteristics of the two coils being so selected that the break contact is opened when the current carried by said winding and the relay coil in series therewith reaches a predetermined value less than the steady state value, the break contact being thereafter held open by the shunt coil of the relay.

11. An electro-magnetic control device, as claimed in claim 1, a circuit breaker for controlling the transmission of power in a power line, said control action comprising mechanism for actuating the circuit breaker, means responsive to the electromagnet upon energization thereof for operating the mechanism to actuate the circuit breaker and fluid pressure means controlled by the mechanism upon operation thereof for actuating the contact breaking means.

12. An electro-magnetic control device, as claimed in claim 8, wherein the circuit-breaking means is constituted by a quick cut-off pressure responsive mechanism.

13. An electro-magnetic control device, as claimed in claim 1, comprising means to prevent the circuit from unexpectedly reclosing once it has been interrupted by the contact-breaking means.

References Cited in the file of this patent
UNITED STATES PATENTS

| | | |
|---|---|---|
| 1,932,119 | Reed | Oct. 24, 1933 |
| 2,801,372 | Renick | July 30, 1957 |
| 2,832,011 | Ashenden | Apr. 22, 1958 |
| 2,951,188 | Diebold | Aug. 30, 1960 |

OTHER REFERENCES

"Relay Engineering," test published by Struthers-Dunn Inc., Philadelphia, Pa., copyright 1945, page 295, Fig. 155.